United States Patent [19]
Harlin

[11] 3,730,052
[45] May 1, 1973

[54] CAM GENERATING DEVICE

[76] Inventor: Paul L. Harlin, 46 Pumpkin Delight Road, Milford, Conn. 06460

[22] Filed: Dec. 28, 1971

[21] Appl. No.: 212,953

[52] U.S. Cl. ...................................90/20, 90/11 C
[51] Int. Cl. .............................B23c 1/14, B23c 3/08
[58] Field of Search ...........................90/11 C, 20

[56] References Cited

UNITED STATES PATENTS 2,990,753   7/1961   Spohn .....................................90/20

Primary Examiner—Francis S. Husar
Attorney—James T. Kline et al.

[57] ABSTRACT

Apparatus for generating cam surfaces comprising a slide movable with respect to a fixed base and having a rotatable workpiece carriage thereon and an adjustable eccentric pin for moving the slide in a predetermined relation to the rotation of the workpiece to generate, by selective gearing, harmonic and non-harmonic cam surfaces on the workpiece as desired.

8 Claims, 12 Drawing Figures

Patented May 1, 1973 3,730,052

5 Sheets-Sheet 2

INVENTOR.
Paul I. Harlin
BY
Johnson and Kline
ATTORNEYS

Patented May 1, 1973 3,730,052

5 Sheets-Sheet 3

INVENTOR.
Paul L. Harlin
BY
Johnson and Kline
ATTORNEYS

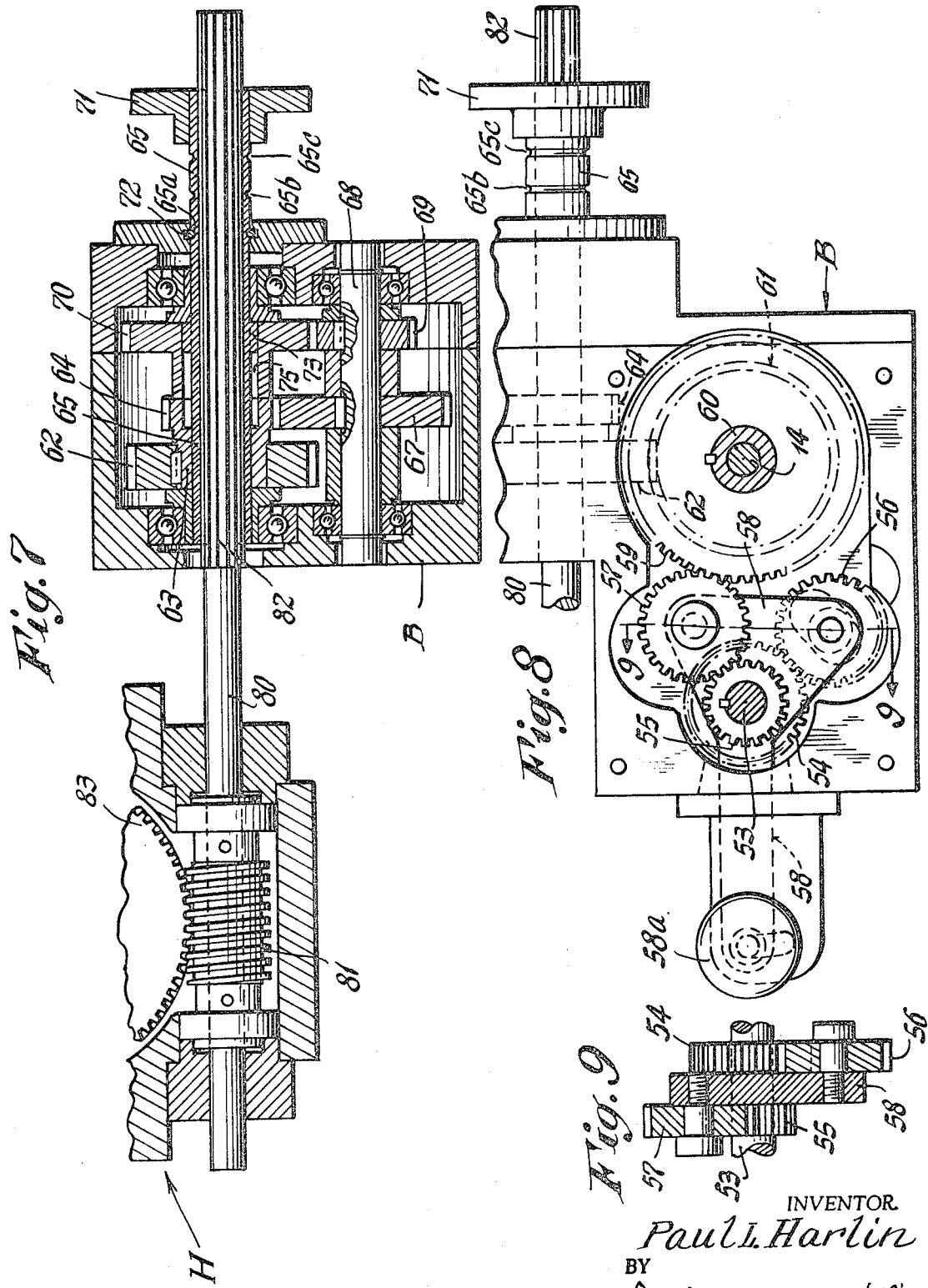

INVENTOR.
Paul L. Harlin
BY
Johnson and Kline
ATTORNEYS

CAM GENERATING DEVICE

Heretofore, it has been the practice to create a template of the cam as desired and to use the template to reproduce the cams. While this may be satisfactory for producing a large number of similar cams, it is extremely costly and time consuming, particularly when only one or a small number of cams are to be produced.

The present invention provides a device for generating the desired cam surface in situ and which may selectively include a harmonic or non-harmonic portion in a simple, efficient and inexpensive operation.

This is accomplished by providing a slide having a carriage mounted thereon having a rotatable work-holding means and providing an adjustable eccentric pin for moving the slide and carriage in predetermined relation to the rotation of the workpiece on the carriage. By proper selection and manipulation of clutches and gearing, the required cam surface can be generated on the workpiece.

Figure 1:
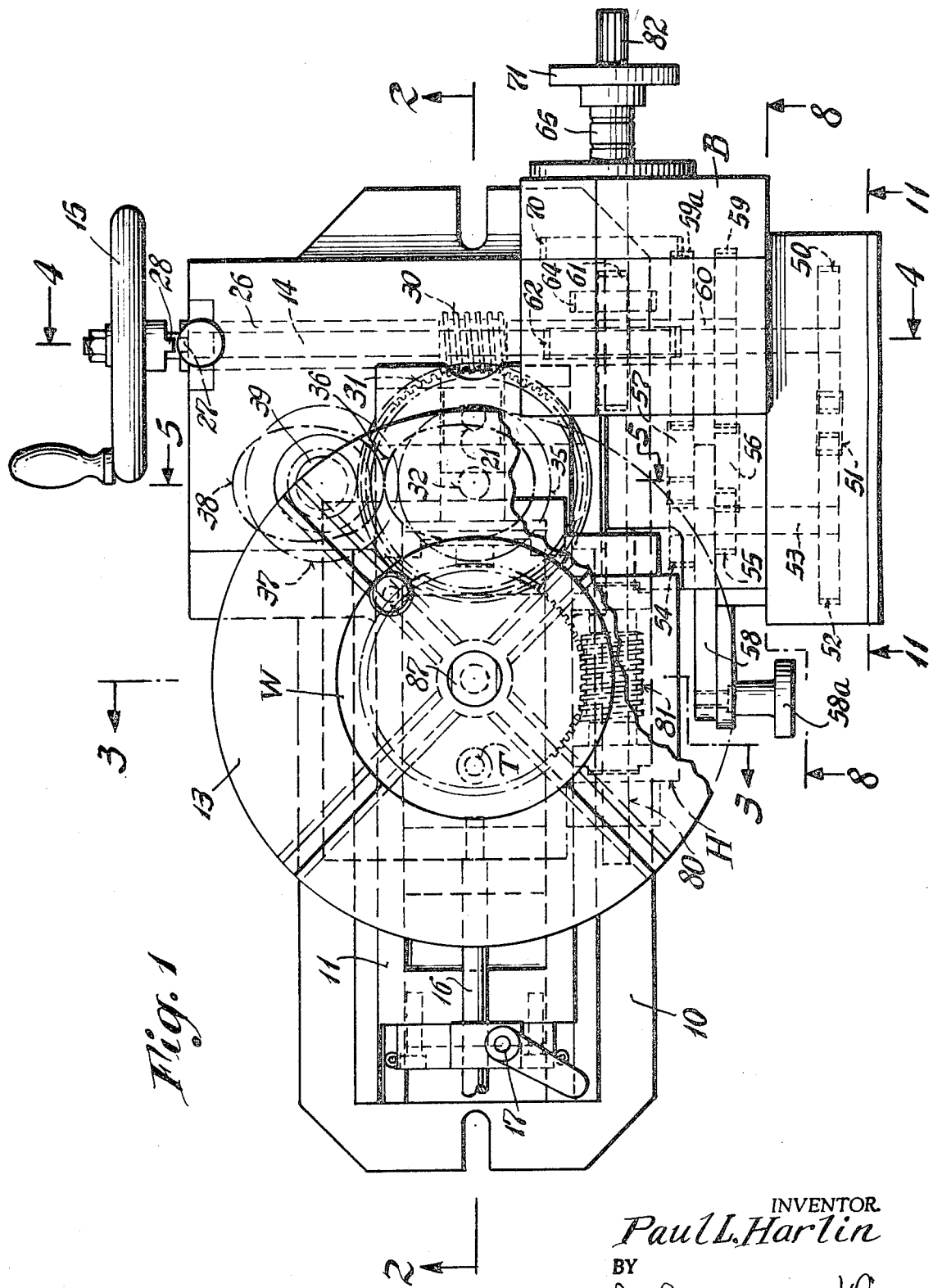
Figure 2:
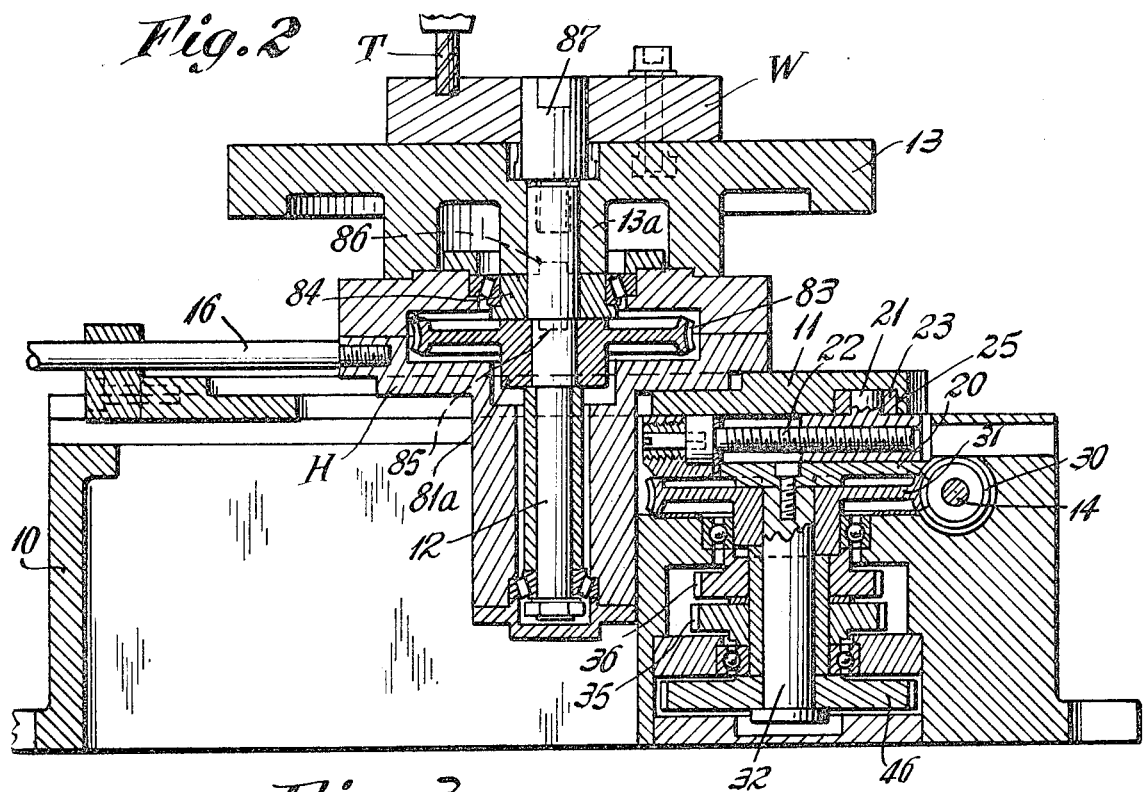
Figure 3:
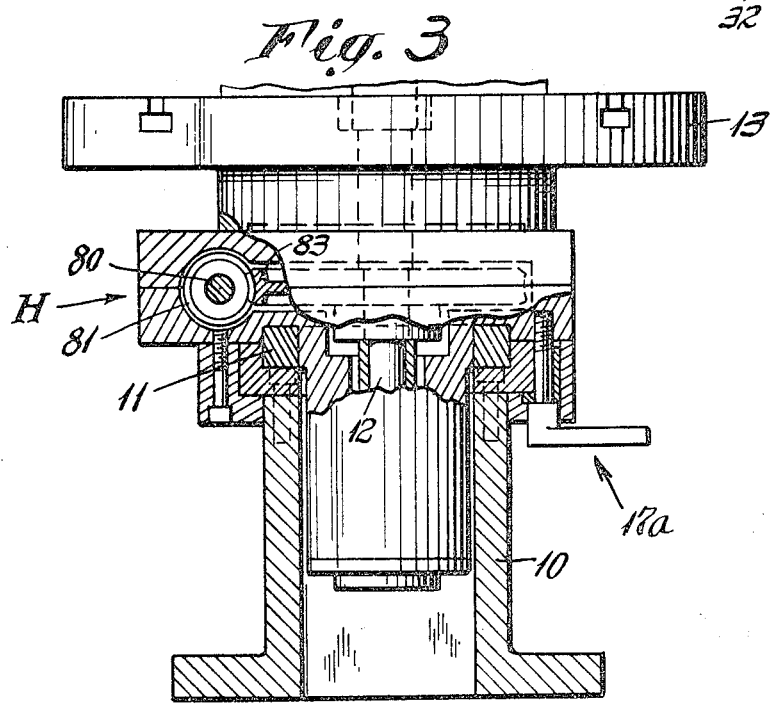
Figure 4:
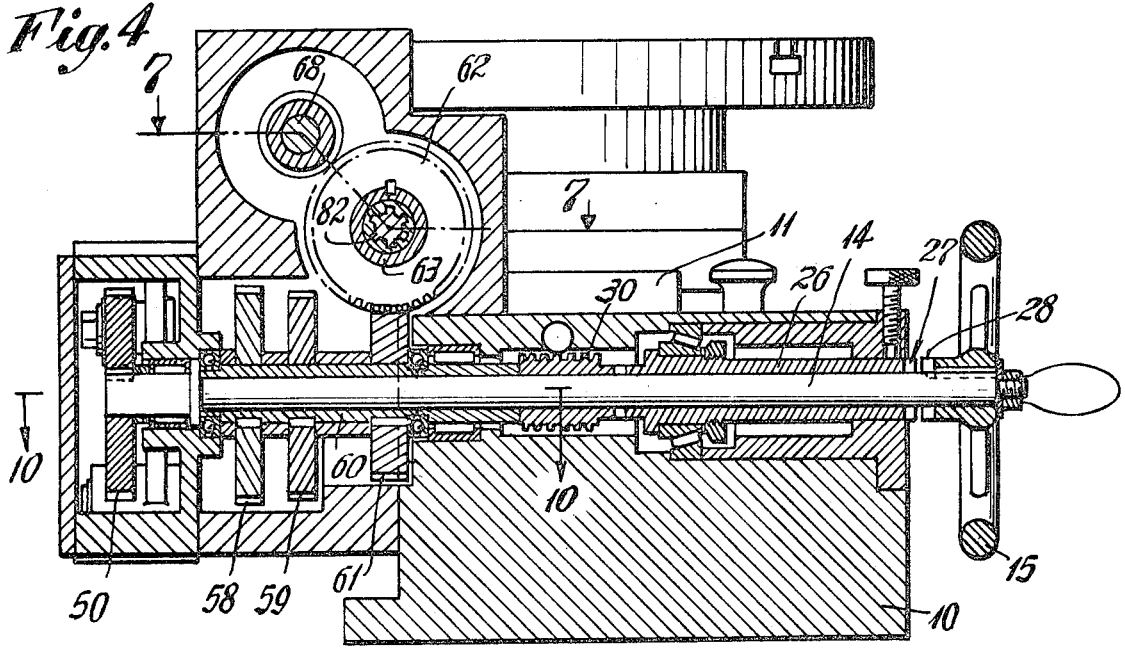
Figure 5:
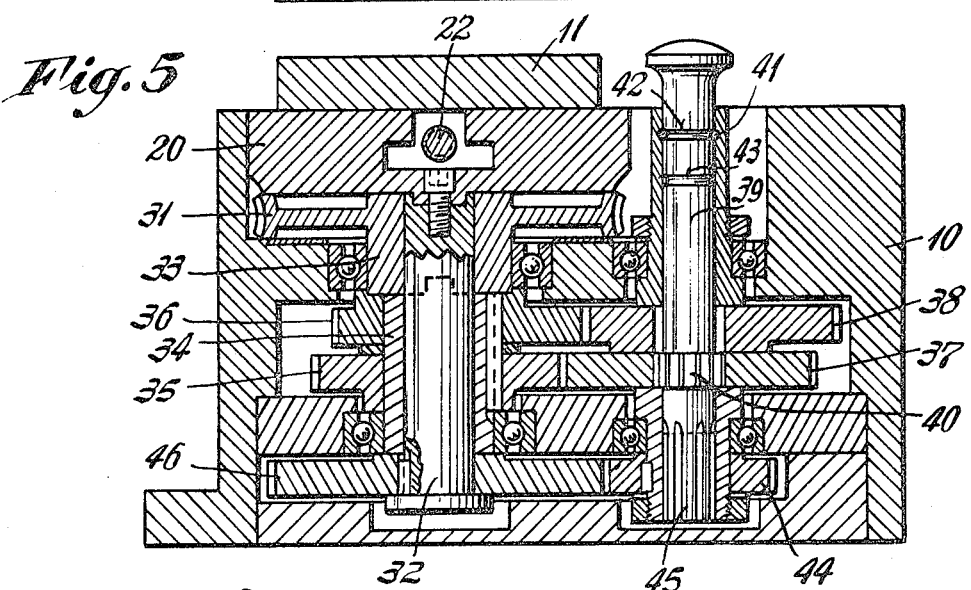
Figure 6:
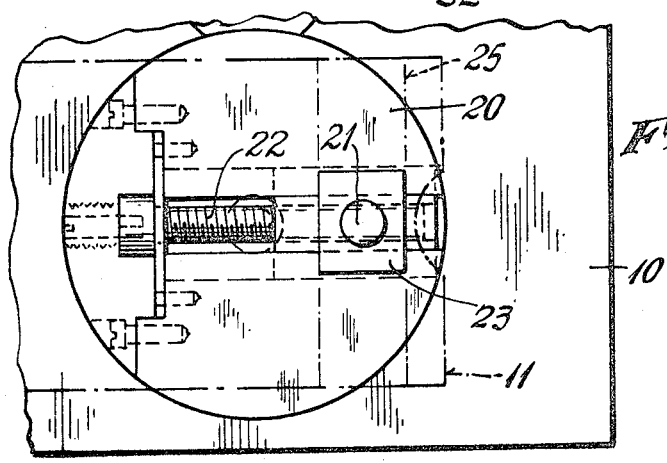
Figure 10:
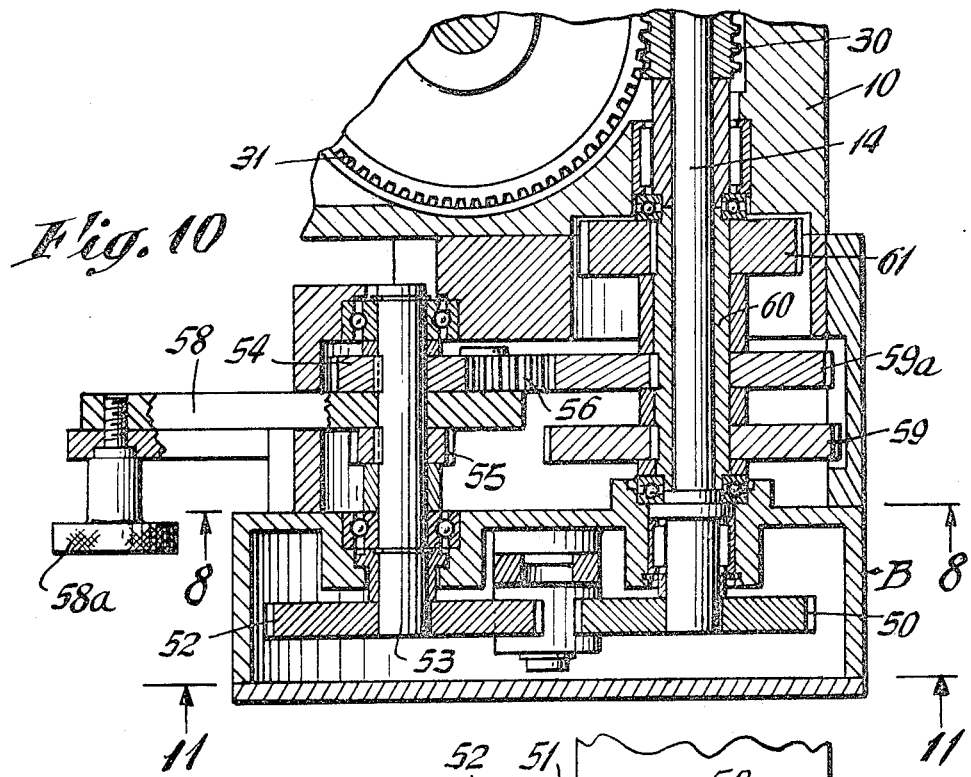
Figure 11:
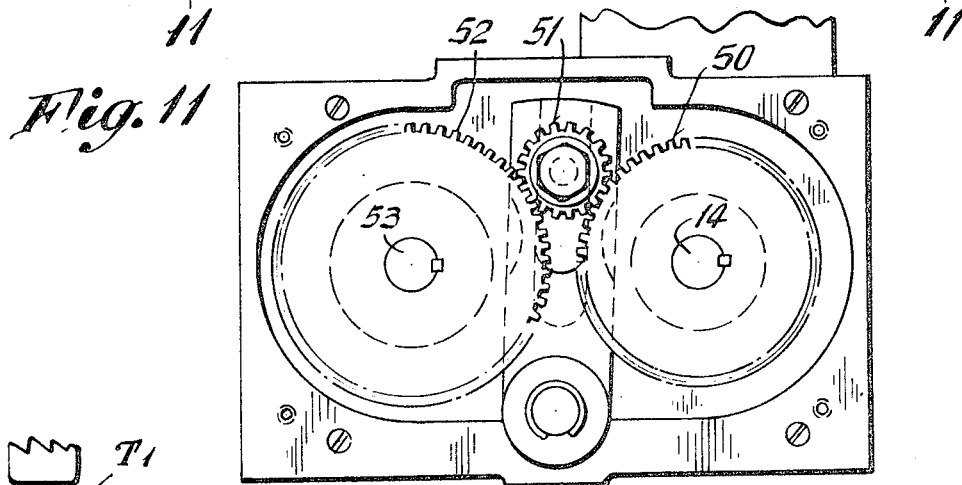
Figure 12:
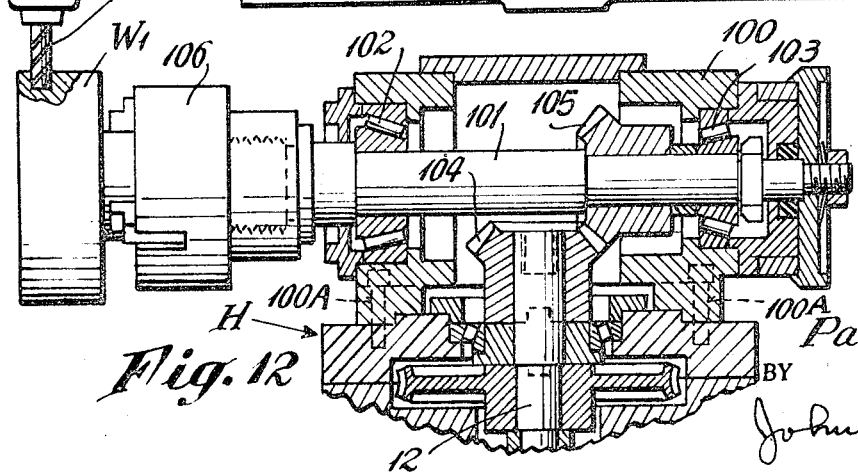

Other features and advantages of the invention will be apparent from the specification and claims when considered in connection with the accompanying drawings in which:

FIG. 1 is a plan view of the device.
FIG. 2 is a sectional view taken along line 2—2 of FIG. 1.
FIG. 3 is a sectional view taken along line 3—3 of FIG. 1.
FIG. 4 is a sectional view taken along line 4—4 of FIG. 1.
FIG. 5 is a sectional view taken along line 5—5 of FIG. 1.
FIG. 6 is a detailed view of the slide-moving eccentric.
FIG. 7 is a sectional view taken along line 7—7 of FIG. 4.
FIG. 8 is a sectional view taken along line 8—8 of FIG. 1.
FIG. 9 is a sectional view taken along line 9—9 of FIG. 1.
FIG. 10 is a sectional view taken along line 10—10 of FIG. 4.
FIG. 11 is a sectional view taken along line 11—11 of FIG. 1.
FIG. 12 is a sectional view of a mounting for a cylindrical cam.

As shown in the drawings, the device of the present invention comprises a base 10 adapted to be mounted on a worktable (not shown) of a suitable machine tool or the like supporting surface. The base has a slide 11 which supports the carriage H slidably mounted on the upper surface thereof. The carriage has a spindle 12 rotatably carrying a work-carrying disk 13 adapted to support a workpiece W in cooperative relation with a cutting tool T as shown in FIG. 2. The spindle 12 is carried by carriage H adjustably connected to the slide 11 by connector 16 and clamp 17. The base carries a main drive shaft 14 actuated by a handwheel 15 keyed therto as shown in FIG. 4 for sliding movement. The main drive shaft will drive the gearing connected to said spindle 12 to rotate the disk 13 as will be explained.

The base has mounted thereon a means for moving said carriage during the formation of the cam surface. As shown in FIGS. 1, 5 and 6, this means comprises a rotatable member or plate 20 having an eccentric pin 21 mounted thereon for adjustment toward and away from the center of rotation of the plate 20 to control the rise of the cam. This adjustment is made by means of a threaded adjusting member 22 (FIG. 6). The pin cooperates with a drive block 23 operating in a transverse slot 25 in the slide to move the carriage in response to movement of the pin by rotation of the plate 20.

To rotate the plate 20 to slide the carriage in predetermined relation with the rotation of the workpiece W, a sleeve 26, FIG. 4, is rotatably mounted on the drive shaft 14 and has a clutch portion 27 engageable by a clutch portion 28 on the handwheel when the handwheel is slid inwardly on the drive shaft 14. The sleeve 26 has a double thread worm gear 30 meshing with a double thread wormwheel 31 rotatable on a drive shaft 32 for the plate. The wormwheel 31 has a hub 33 keyed to a bushing 34. The bushing has keyed thereto for rotation therewith a circular gear 35 and an out-of-round gear 36, such as an elliptical gear. These gears mesh with and drive circular gear 37 and out-of-round gear 38 carried on a parallel shaft 39. The parallel shaft 39 is slidable to connect to either of the gears 37, 38 and to be driven therewith by a spline 40 when the shaft is selectively moved to either of two positions defined by the detent 41 being received in either groove 42 or 43. Rotation of the shaft 39 will turn gear 44 connected thereto by an elongate spline connector 45. Gear 44 will turn gear 46 keyed to the shaft 32, at a two to one reduction, and selectively rotate the plate 20 drivingly connected to said shaft. If the circular gears 35, 37 are connected, the motion given to the carriage with respect to the movement of the workpiece will produce an harmonic cam surface while if the gears 36, 38 are connected to the shaft to drive the drive shaft 32, the cam surface will be a non-harmonic surface.

Should it be desired to produce a second rise on the cam or control a descent on the cam, the carriage is locked to the base by the lock 17a and the slide is unlocked on the carriage by release of the lock 17. The position of the eccentric and the slide connected thereto is adjusted to the required position to produce the additional rise or descent. Thereafter, the locks are returned to their original position connecting the carriage to the slide and releasing the carriage from the base and the device operated to produce the desired cam surface.

If it is desired to produce a dwell on the cam, the handwheel is moved to break the drive to the plate at clutch portion 27 and stop the rotation of the plate 20 and movement of the slide while the drive shaft 14 is turned to rotate the workpiece.

The drive for rotating the work-carrying disk 13 from the driving shaft 14 is shown in FIGS. 1, 4 and 7–11. In FIGS. 1 and 4, the drive shaft 14 is illustrated as driving the gear 50, which through an adjustably mounted idling gear 51 rotates a gear 52 keyed to a shaft 53. The gears 50, 51, 52 are readily accessible, being located at the front of the device and can easily be changed to alter the rate of rotation of the workpiece as driven by shaft 14.

Shaft 53 drives gears 54 and 55 of different sizes (FIGS. 1, 8, 9 and 10) for driving gears 56 and 57 carried by a plate 58 pivotally mounted on shaft 53, which gears are selectively rocked by a handle 58a on the plate 58 into driving engagement with either of the gears 59, 59a keyed to a freely rotating bushing 60 carried by shaft 14 to control the rotation of the workpiece. The bushing 60 also has a gear 61 keyed directly thereto and in driving engagement with gear 62 keyed to a bushing 63 of a gear 64 rotatable on a sleeve 65 adjustably carried by housing B mounted on the base 10. The gear 64 meshes with the gear 67 keyed on a parallel shaft 68. Also carried by the shaft 68 is a gear 69 keyed thereto and meshing with gear 70 disposed on the sleeve 65.

As shown in FIG. 7, the sleeve 65 is slidable in a housing B and moved by handle 71 to three positions as determined by the grooves 65a, 65b, 65c thereon which cooperate with the fixed detent 72. Also, the sleeve 65 has a key 73 which cooperates with keyways in gears 64 and 70 to rotate the sleeve. As shown in FIG. 7, the detent 72 is in groove 65a and in this position key 73 is in driving relation with gear 70 to be rotated by said gear. The drive is from gear 62, gear 64, gear 67, gear 69, gear 70 and the key 73. When the sleeve 65 is moved to the position to place detent 72 into groove 65b, the key 73 is disengaged from gear 70 and located in a non-connecting space 75 formed in the hub of the gear 70 and the sleeve 65 does not rotate. In this position the spindle drive is stopped and rotation of the spindle ceases. When the sleeve 65 is shifted to place detent 72 in the groove 65c, the key 73 engages the keyway of the gear 64 and is directly driven thereby.

As shown in FIGS. 1–3 and 7, the sleeve 65 carries a shaft 80 having a worm gear 81. The worm gear 81 and shaft 80 are connected to the carriage H for the spindle 12 to move therewith as the slide 11 and its carriage are moved by the eccentric pin 21. The shaft 80, as shown in FIGS. 3 and 7, has an elongate sliding spline connection 82 with the sleeve 65 to be rotated thereby in all its movement by and with the carriage. The worm gear 81 meshes with the wormwheel 83 rotatably on the spindle 12 and is connected to a bushing 84 rotatable on the carriage by keyway 85 which connects the hub 81a and the wormwheel to be rotated therewith. Bushing 84 has a key 86 connected to the hub 13a of the disk to drive the same. Disk 13 is clamped into position by a clamping bolt 87 threaded into the end of the spindle.

It will be seen that by proper and controlled movement of the eccentric pin for controlling the movement of the slide in connection with the rotation of the workpiece carried by the carriage mounted on the slide, the required rise or rises, dwells, and descents can be readily achieved and the desired cam generated by the machine.

If desired to produce a cylindrical cam, the work-carrying disk 13 is removed and a chuck housing 100 is secured to carriage H for the spindle 12 by bolts 100A. The chuck housing has a shaft 101 rotatably mounted in bearings 102, 103 and disposed at right angles to the spindle 12 and the shaft 101 is driven from the spindle 12 through bevelled gears 104 and 105. One end of the shaft 101 projects from the housing 100 in the direction of movement of the carriage and has a chuck 106 for holding a workpiece $W_1$ in predetermined relation to a fixed tool $T_1$ as shown in FIG. 12. Thus, by suitably driving the spindle to rotate the chuck and moving the carriage, the required cam surface can be generated on the workpiece $W_1$.

Variations and modifications may be made within the scope of the claims and portions of the improvements may be used without others.

I claim:

1. In a cam generating device having a fixed cutting tool, a base, a slide having a carriage connected thereto, said slide being slidably mounted on the base, means including an eccentrically mounted drive pin mounted on a rotatable plate and operating in a transverse slot on said slide for moving the slide and carriage on said base, a rotatable work-carrying means on the carriage for holding a workpiece in predetermined relation with said tool, means for rotating said work-carrying means, and means including suitable gearing for actuating said means for moving said carriage in predetermined relation to the rotation of said means to rotate the work-carrying means to generate a predetermined cam.

2. The invention as defined in claim 1 wherein there is provided means to connect the carriage to the base and disconnect the carriage from the slide whereby the slide and drive pin can be adjusted without shifting the carriage for the purpose of altering the shape of the cam surface being generated.

3. The invention as defined in claim 1 wherein the means for rotating the workpiece comprises readily accessible replaceable gears for altering the rate of rotation of said workpiece.

4. The invention as defined in claim 1 wherein said drive pin is adjustably mounted to vary its eccentricity to control the rate and extent of the rise of the cam surface.

5. The invention as defined in claim 1 wherein said plate is driven by selective gear means to generate different cam surfaces.

6. The invention as defined in claim 5 wherein said selective gear means includes circular gear means to produce a harmonic cam portion.

7. The invention as defined in claim 5 wherein said selective gear means includes out-of-round gear means to produce a non-harmonic cam portion.

8. In a cam generating device having a fixed cutting tool, a base, a drive shaft rotatably mounted on said base, a slide slidably mounted on the base, a carriage mounted on said slide, means for moving the slide on said base comprising a rotatable member having an adjustable drive pin eccentrically mounted thereon and connected to said slide, a rotatable work-carrying means on the carriage for holding a workpiece in predetermined cooperative relation with said tool, means connected to said drive shaft for rotating said work-carrying means, and actuating means for said drive pin including clutch means connectable to said drive shaft for actuating said driving pin for moving said slide and carriage in predetermined relation to the rotation of the means to rotate the work-carrying means to generate a predetermined cam, said carriage actuating means including selectable gearing adapted to produce harmonic or non-harmonic cam surfaces.

* * * * *